United States Patent [19]

Berz

[11] 3,868,237
[45] Feb. 25, 1975

[54] DUST FILTER

[76] Inventor: Wolfgang Berz, Mauerkircherstrasse 13, Munich, Germany

[22] Filed: Apr. 30, 1973

[21] Appl. No.: 355,917

[30] Foreign Application Priority Data
May 5, 1972 Germany............................ 2222170

[52] U.S. Cl........................ 55/270, 55/272, 55/283, 55/287, 55/288, 55/293
[51] Int. Cl............................................ B01d 53/30
[58] Field of Search ............ 55/273, 282, 283, 284, 55/302, 271, 272, 291, 293, 304, 294, 96, 97, 98, 288, 286, 287; 210/277; 251/228; 209/502; 137/625.18

[56] References Cited
UNITED STATES PATENTS

| | | | |
|---|---|---|---|
| 3,073,097 | 1/1963 | Hallett et al. .......................... | 55/283 |
| 3,189,079 | 6/1965 | Ferguson ............................. | 251/228 |
| 3,375,641 | 4/1968 | Labbe ................................... | 55/302 |
| 3,487,435 | 12/1969 | Sheardown .................... | 137/625.18 |
| 3,545,178 | 12/1970 | Sheehan ............................... | 55/272 |
| 3,564,570 | 2/1971 | Lincoln et al .......................... | 55/302 |
| 3,594,991 | 7/1971 | Berz et al .............................. | 55/294 |
| 3,756,416 | 9/1973 | Wood ................................... | 55/293 |

FOREIGN PATENTS OR APPLICATIONS

| | | | |
|---|---|---|---|
| 778,537 | 7/1957 | Great Britain ........................ | 55/282 |
| 304,837 | 1/1929 | Great Britain ...................... | 251/228 |

Primary Examiner—Frank W. Lutter
Assistant Examiner—David L. Lacey
Attorney, Agent, or Firm—Hans Berman

[57] ABSTRACT

A filter for removing particulate contaminants from a gas has a filter chamber divided into two compartments by a horizontal bed of sand or the like. The contaminated gas flows downward through the filter bed for its purification, and a purging gas backwashes the bed from time to time for regenerating the same. Independent valves control the two gas streams in such a manner that flow of the contaminated gas stream is throttled while the permeability of the filter bed is low immediately after regeneration while flow of the purging gas may be started suddenly for shaking the filter bed.

11 Claims, 3 Drawing Figures

Fig.2

DUST FILTER

This invention relates to filters for removing particulate solid material from a gas contaminated with the material, and particularly to improved controls for the flow of gases through a filter having a filter bed of particulate filter medium which is regenerated from time to time by backwashing with a purging gas.

In its more specific aspects, this invention is concerned with an improvement in the filter disclosed in U.S. Pat. No. 3,594,991. The filter of the earlier patent is equipped with a double acting valve in which a single valve member is moved between sealing engagement with two valve seats, interrupting the flow of the gas to be purified or the flow of the purging gas employed for regenerating the particulate filter bed which divides a filter chamber into an upper compartment and a lower compartment.

As in all filters of this type, a first conduit connects the upper compartment to a source of the gas to be purified, and a second conduit releases the purified gas from the lower compartment. A third conduit connects the lower compartment to a source of the purging gas, and a fourth conduit releases the purging gas and the contaminant particles entrained thereby from the upper compartment. The flow of the gas to be purified is thus conveyed in a first path while the purging gas is conveyed in a second path. Since one member of each pair of conduits associated with a path terminates in the upper compartment and the other members terminate in the lower compartment, one double-acting valve communicating either with the upper or lower compartment could be employed for controlling the flow of both gases, and this arrangement has been used successfully for years.

It has now been found that considerable advantages can be achieved by providing two individual, independently operated valves in the two pairs of conduits. The known, double-acting valve must be switched quickly between its two positions to prevent mixing of the two gas streams. A freshly regenerated filter bed is thus exposed to a strong stream of contaminated gas while its permeability is still high, and particularly its ability of retaining small contaminant particles is not yet fully established by the deposition of contaminant particles which themselves act as filter aids. The gas passing rapidly through the filter bed immediately after regeneration may be almost as contaminated as the raw gas, and may have to be recycled. The sudden onset of the stream of purging gas, on the other hand, is beneficial in shaking up the layer of particulate filter medium.

By providing individual valves in the two gas streams, it is possible to increase the flow rate of the raw gas gradually after the filter bed was regenerated in proportion to the ability of the filtering layer of retaining contaminants. Such ability may be determined by means of apparatus measuring the particulate concentration in the effluent gas, as by the Tyndall effect, or by measuring the pressure drop across the filter bed. Either measurement may supply a control signal for setting an automatically operated valve for the gas to be purified either in the first or second conduit mentioned above while a second valve in the purging gas circuit may be operated to produce the desired shock effect when regenerating is started, and to prevent mixing of the two gas streams.

It has further been found that the valve plate of the earlier patent which is moved toward and away from the two associated valve seats in the direction of gas flow through the openings in the valve seats is replaced to advantage by an arrangement in which a valve member is moved toward and away from its closing position transversely to the direction of gas flow. Contaminant particles tend to accumulate in at least a thin layer on all internal surfaces of a filter of the type under discussion, and the accumulations are heaviest in those conduits which convey the row gas to be purified and the purging gas entraining particles removed from the filter bed. Full sealing engagement between a valve member and its valve seat is virtually impossible when the seat carries accumulated contaminant particles, and the valve member moves toward the seat in the direction of gas flow. When the valve member moves transversely to the gas flow, the contaminants are wiped from the seat during each closing movement of the valve member, and the valve is self-cleaning.

Other features, additional objects, and many of the attendant advantages of this invention will readily be appreciated as the same becomes better understood by reference to the following detailed description of preferred embodiments when considered in connection with the appended drawing in which:

FIG. 2 is a fragmentary elevational view of a filter arrangement including two modified units of the general type shown in FIG. 1.

Figure 1:
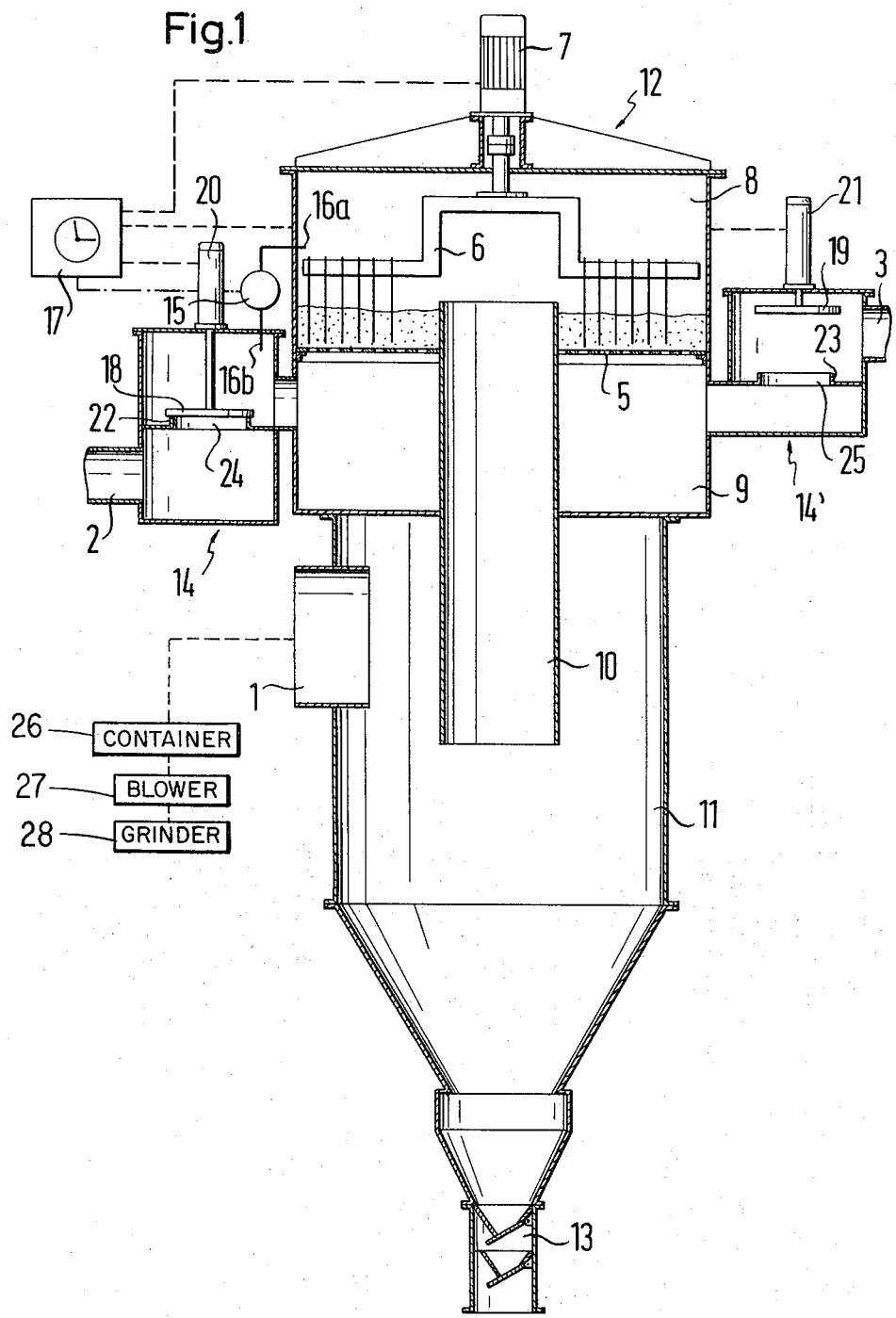
FIG. 1 shows a dust filter unit of the invention in elevational section.

Referring now to the drawing in detail, and initially to FIG. 1, there is shown a dust filter unit of the invention similar in its basic features to the filter arrangement of the afore-mentioned earlier patent. A cylindrical filter chamber 12 is mounted coaxially atop a cyclone 11 and is divided into an upper compartment 8 and a lower compartment 9 by a horizontal, perforated supporting plate 5 and by a filter medium consisting of a layer 4 of sand or small pebbles on the plate 5. The tines of a rake 6 extend downward in the compartment 8 into the layer 4 and may be moved about the common axis of the chamber 12 and the cyclone 11 by an electric motor 7 mounted on the top cover of the chamber 12. A wide, upright pipe 10 axially connects the cyclone 11 with the compartment 8. An air lock 13 including two individually operated valve flaps permits solids to be discharged from the bottom of the cyclone 11. A pipe 1 leads into the cyclone 11 and combines the functions of an inlet and an outlet, as will presently be described.

Two valve chambers 14, 14' are mounted outside the filter chamber 12 and communicate with the compartment 9. A valve seat plate 22 divides the interior of the chamber 14 and has a raised circular rim about an opening 24 which, in the illustrated condition of the apparatus, is sealed by a valve plate 18 mounted on the piston rod of a double-acting hydraulic cylinder 20 so as to separate an outlet pipe 2 from the compartment 9. The chamber 14' is similarly provided with a valve seat plate 23 having an opening 25 capable of being sealed by a valve plate 19 operated by a hydraulic cylinder 21. An intake pipe 3 is connected with the compartment 9 in the illustrated position of the valve plate 19.

The positive displacement pump which supplies the cylinders 20, 21 with hydraulic fluid and the system of electrically operated reversing and control valves interposed between the pump and the cylinders have not been shown since they are entirely conventional in their structure and operation. The non-illustrated valves and the motor 7 are automatically set by a timing controller 17 which receives signals from a differential pressure gage 15. The gage is connected by sensing lines 16a, 16b to the compartments 8, 9, respectively, and its output signals are indicative of the pressure difference between the two compartments.

The operation of the apparatus of FIG. 1 will be described with reference to its use for removing particulate contaminants from air exhausted from a grinder, but other applications will readily suggest themselves. In the illustrated operating stage of the apparatus, which is reached at the end of the third stage of its operating cycle the filter medium 4 is being regenerated by means of compressed purging air supplied from the intake or inlet pipe 3, which may be a part of a compressed air distribution system not otherwise shown, while the valve plates 18, 19 are held in the illustrated, respective closed and open positions, and the motor 7 is energized by the controller 17. The air flows upward through the openings in the foraminous plate 5 and through the layer 4 of filter medium in a path defined by the inlet pipe 3 and the pipe 1 acting as an outlet while the filter medium is being agitated by the rake 6. Previously accumulated grinding dust shaken from the filter medium is carried by the air stream through the pipe 10 into the cyclone 11 where a portion of the particulate matter is deposited, and the purging gas carrying the remainder of the dust is discharged through the pipe 1 into a container 26 interposed between the exhaust blower 27 of the grinder 28 and the cyclone 11.

After a period that may be set manually on the controller 17, the controller, in a fourth stage of operation, deenergizes the motor 7, admits fluid to the cylinder 21 to block the flow of gas through the opening 25 by means of the plate 19, and thereby to discontinue the supply of purging air at its inlet, and withdraws the valve plate 18 from the opening 24 at a rate controlled by the output signal of the pressure gage 15 in such a manner as to maintain a preset pressure drop across the layer 4 of the filter medium by gradually opening the path of gas flow through the opening 24.

The freshly regenerated filter layer 4 offers little resistance to the stream of dust-laden air supplied to the pipe 1 by the exhaust blower 27. The opening provided between the valve plate 18 and the raised rim of the seat plate 22 in the fourth stage thus is so small as to pass only a very slow stream of fluid through the layer 4 in a path defined by the pipe 1 acting as an inlet and the outlet pipe 2, and to minimize the amount of particulate matter which could be carried through the filter bed. As the flow resistance of the latter is increased by retained dust, the valve plate 18 ultimately is withdrawn fully during a fifth stage to a position analogous to the illustrated position of the valve plate 19. Normal operation of the unit then continues in the first or principal stage of the next cycle of operations in which the valve plate 18 is in the fully open position and the valve plate 19 seals the opening 25. When the flow resistance of the filter layer reaches a preset value, the second cycle stage is initiated by the controller 17 which first reverses the valves of the cylinder 20 to seal the pure air outlet 2, by means of the valve plate 18, thereby preventing the entry of further dust-laden air into the cyclone 11 through the pipe 1, and thereafter reverses fluid flow to the cylinder 21 at the beginning of the next, third stage to admit purging air for a fixed period, the valve plate 19 being withdrawn at the full available speed of the cylinder 21 to utilize the shock effect of the suddenly admitted compressed air on the particles of the filter medium.

The advantages of the dual valve arrangement of the invention over the single switching valve of the earlier patent are evident from the preceding description. Particulate contaminants which themselves have an important filtering effect, are built up on the permanent filter medium at a low rate of gas flow to prevent a significant amount of contaminants from passing the freshly regenerated filter medium and from being discharged through the pure gas outlet 2. Yet, the regeneration of the filter medium, when charged to capacity wtih contaminants, is started by a shock wave of purging gas highly effective in quickly shaking the dust from the sand particles or pebbles in the layer 4.

Figure 2:
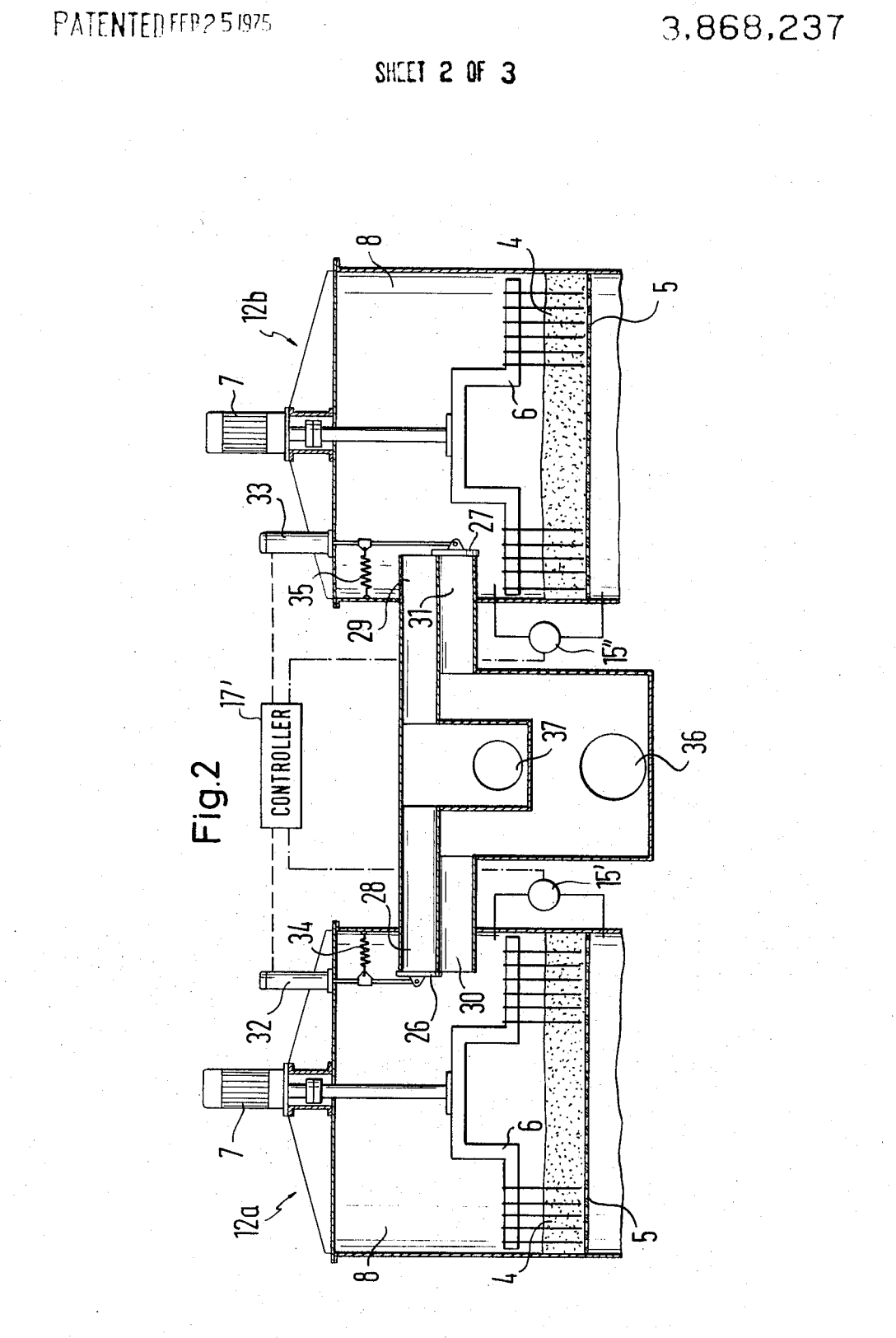

FIG. 2 shows an arrangement in which pairs of dust filter units are coupled in such a manner that the filter layer of one member 12b of the pair is being regenerated while the other member 12a operates, and vice versa. The rakes 6 and associated drive motors 7 in the units 12a, 12b are identical with the corresponding elements in FIG. 1.

A conduit 36 serves as a source of raw gas for two branches 30, 31 of square cross section which enter the upper compartments 8 of the filter chambers 12a, 12b through respective openings in the filter chamber walls. Branches 28, 29 of a purging gas discharge conduit 37 pass through the same openings respectively and have orifices in the compartments 8 contiguously juxtaposed and flush with the orifices of the raw gas branch conduits 30, 31.

A valve plate 26 is suspended in the compartment 8 of the filter chamber 12a from the piston rod of a hydraulic cylinder 32 and held in sealing engagement with the orifice of the branch conduit 28 by a helical tension spring 34, while a valve plate 27 in the filter chamber 12b is similarly suspended from a hdraulic cylinder 33 and seals the orifice of the branch conduit 31 under the pressure of a spring 35.

The hydraulic cylinders 32, 33 are operated by liquid under pressure controlled by a controller 17' which receives output signals indicative of the pressure drop across the layers 4 of filter medium on foraminous supporting plates 5 from respective differential pressure gages 15', 15''. The gages 15', 15'' may be identical with the afore-described gage 15, and the controller 17' differs from the controller 17 in lacking the timing function of the latter. The controller 17' also energizes and deenergizes the rake motors 7 in a manner not explicitly shown in FIG. 2, and the instantaneously operating shut-off solenoid valves, not shown, which admit compressed air to the lower compartment of the filter chamber 12b while blocking the release of gas from the lower compartment to the atmosphere as illustrated at 14, 14' in FIG. 1, and the analogous valves in the lower compartment of the chamber 12a.

In the illustrated condition, raw gas enters the filter chamber 12a from the conduit 36, and the purified, filtered gas is discharged to the atmosphere from the lower compartment of the chamber 12a in a non-illustrated manner, obvious from FIG. 1. Compressed air passes upward through the foraminous supporting plate 5 and the layer 4 of filter medium in the chamber 12b while the filter layer is being agitated by the associated rake 6, and the dust-laden purging gas is discharged through the conduit 37. When the filtered dust raises the pressure differential across the layer 4 in the chamber 12a to a predetermined maximum value, the gage 15' causes the controller 17' simultaneously and practically instantaneously to shut off the associated rake motor 7 and non-illustrated compressed air valve, to open the non-illustrated pure-air outlet in the filter chamber 12b, to shut the pure-air outlet in the chamber 12a, and to lower the valve plate 26 into sealing engagement with the orifice of the branch conduit 30. Thereafter, the valve plate 27 is raised gradually at a rate to maintain a desired pressure differential across the filter layer 4 in the chamber 12b. When the orifice of the branch conduit 29 is sealed by the plate 27, the non-illustrated compressed-air valve in the filter chamber 12a is opened suddenly, and regeneration of the filter medium in the chamber 12a is started in a condition of the apparatus analogous to that illustrated in FIG. 2.

The conduits 28, 29, 30, 31 convey gas carrying particulate contaminants, and their orifices, when open, receive deposits of dust and other particles which would interfere with proper sealing of the orifices by valve bodies of the type shown in FIG. 1 which move between open and closed positions in the direction of fluid flow through the associated valve seats. The plates 26, 27 move transversely to the direction of fluid flow through the valve seats constituted by the orifices of the associated branch conduits and wipe accumulated particles from the valve seats.

Figure 3:
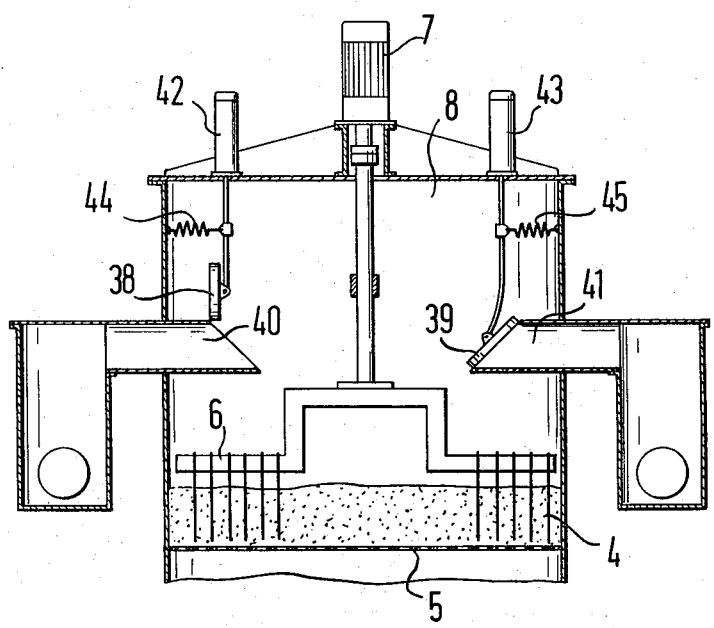
FIG. 3 shows yet another modified filter unit in fragmentary elevational view.

The advantages of such an arrangement are also available in individual filter units of the invention as is shown in FIG. 3. The conduits 40, 41 respectively admit raw gas to the upper compartment 8 and release dust-laden purging gas from the compartment. They are controlled by valve plates 38, 39 pivotally suspended from the flexible, resilient piston rods of respective hydraulic cylinders 42, 43 and held in sealing engagement with the conduit orifices by helical tension springs 44, 45. The orifices of the conduits 40, 41 provide valve seats which are inclined relative to the vertical at an acute angle, and it has been found that such inclined orifices are swept clean of deposited particulate contaminants by the valve plates 38, 39 in a particularly effective manner, the valve plates being moved between their opening and blocking positions obliquely relative to the direction of gas flow from the conduits 40, 41.

The lower compartment of the filter chamber and associated devices have been omitted from FIG. 3 for the sake of clarity together with the automatic controls for the cylinders 42, 43 and the motor-driven rake for the filter medium 4 on the foraminous supporting plate 5, as these features will be obvious from FIGS. 1 and 2. Conversely, the valve arrangements illustrated in FIGS. 2 and 3 may be substituted in the valve chambers 14, 14' of FIG. 1 for the horizontal valve seat plates 22, 23 in an obvious manner. Depending on the nature of the contaminants in the gas and the nature of the filter layer 4, the valve seats leading outward of the lower filter compartment 9 may be subject to accumulation of particles interfering with proper sealing in the absence of self-cleaning valves of the type shown in FIGS. 2 and 3, and the use of such valves in the apparatus of FIG. 1 is specifically contemplated.

Instead of pressure sensors, the controllers 17, 17' may be equipped with apparatus, conventional in itself, for measuring the particulate concentration in the purified, effluent gas by the Tyndall effect, and line 16b may represent such alternative apparatus.

It should be understood, therefore, that the foregoing disclosure relates only to preferred embodiments of the invention, and that it is intended to cover all changes and modifications of the examples of the invention herein chosen for the purpose of the disclosure which do not depart from the spirit and scope of the invention set forth in the appended claims.

What is claimed is:

1. In a filter arrangement for purifying a gas of particulate solid material with which said gas is contaminated, said arrangement including a filter chamber, first inlet means for admitting contaminated gas to said chamber, first outlet means for releasing purified gas from said chamber, second inlet means for admitting a purging gas to said chamber and second outlet means for discharging said purging gas from said chamber, a layer of particulate filter medium in said chamber, said first inlet means and said first outlet means defining a first path of gas flow through said chamber, said first path passing through said layer in one direction from said first inlet means to said first outlet means, said second inlet means and said second outlet means defining a second path of gas flow through said chamber, said second path extending from said second inlet means toward said second outlet means and passing through said layer in a direction opposite to said one direction, first valve means in said first path movable between a path opening and a path blocking position, second valve means in said second path movable between a path opening and a path blocking position, the improvement which comprises:

a. first and second valve operating means respectively associated with said first and second valve means for moving the associated valve means between said positions thereof; and b. valve control means operatively connected to said valve operating means for causing operation of said valve means in cycles of sequential stages, each cycle including 1. a first stage wherein said first valve means is in the path opening position and said second valve means is in the path blocking position, 2. a second stage wherein said first valve means is being moved to the path blocking position while said second valve means remains in the path blocking position, 3. a third stage wherein said second valve means is being moved to the path opening position while said first valve means remains in the path blocking position, 4. a fourth stage wherein said second valve means is being moved to the path blocking position while said first valve means remains near the path blocking position, and 5. a fifth stage wherein said first valve means is being moved into the path opening position while said second valve means remains in the path blocking position.

2. In an arrangement as set forth in claim 1, said valve control means including means for causing movement of said first valve means in said fifth stage into said path opening position thereof at a speed smaller than the speed of movement of said second valve means to the path opening position of the same in said third stage.

3. In an arrangement as set forth in claim 2, sensing means for sensing a differential of gas pressures in one of said paths across said layer, said valve control means being operatively connected to said sensing means for controlling operation of said first valve means in said fifth stage in response to a sensed pressure differential of predetermined magnitude.

4. In an arrangement as set forth in claim 2, sensing means for sensing the concentration of said particles in said purified gas, said valve control means being operatively connected to said sensing means for controlling operation of said first valve means in said fifth stage in response to a second concentration of predetermined magnitude.

5. In an arrangement as set forth in claim 2, said first valve means including a first valve member and a first valve seat in said first outlet means, said second valve means including a second valve member and a second valve seat in said second inlet means, and said valve operating means including means for moving said valve members relative to said valve seats between respective path opening and path blocking positions.

6. In an arrangement as set forth in claim 2, said first valve means including a first valve member and a first valve seat in said first inlet means, said second valve means including a second valve member and a second valve seat in said second outlet means, and said valve operating means including means for moving said valve members relative to said valve seats between respective path opening and path blocking positions.

7. In an arrangement as set forth in claim 2, a single pipe leading into said chamber and consituting a common portion of said first inlet means and said second outlet means.

8. In an arrangement as set forth in claim 2, one of said valve means including a valve member and a valve seat, said valve operating means including means for moving said valve member relative to said valve seat between a path opening and a path blocking position for flow of gas through said valve seat in a predetermined direction when said valve member is in the path opening position, said valve operating means moving said valve member between said positions thereof in a direction transverse to said predetermined direction and in wiping engagement with said valve seat, said valve seat extending in a plane parallel to said transverse direction.

9. In an arrangement as set forth in claim 8, said transverse direction being obliquely inclined relative to said predetermined direction.

10. In an arrangement as set forth in claim 8, said valve member being mounted in said chamber.

11. In an arrangement as set forth in claim 8, said one valve means further including yieldably resilient means biasing said valve member toward said wiping engagement during said moving of the valve member.

* * * * *